(12) United States Patent
Engelhardt et al.

(10) Patent No.: US 10,210,068 B2
(45) Date of Patent: Feb. 19, 2019

(54) DEVICE TOPOLOGY DEFINITION SYSTEM

(71) Applicant: Leviton Manufacturing Co., Inc., Melville, NY (US)

(72) Inventors: Brian Engelhardt, Bothell, WA (US); Frank Kim, Woodinville, WA (US); Jason Erickson, Bothell, WA (US); Jay Treptow, Bothell, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 231 days.

(21) Appl. No.: 15/054,076

(22) Filed: Feb. 25, 2016

(65) Prior Publication Data

US 2016/0299826 A1    Oct. 13, 2016

Related U.S. Application Data

(60) Provisional application No. 62/146,686, filed on Apr. 13, 2015.

(51) Int. Cl.
    *G06F 11/30* (2006.01)

(52) U.S. Cl.
    CPC ...... *G06F 11/3048* (2013.01); *G06F 11/3065* (2013.01); *G06F 11/3051* (2013.01); *G06F 11/3055* (2013.01)

(58) Field of Classification Search
    CPC . G06F 11/3048; G06F 1/3065; G06F 11/3051
    USPC ........................................................ 709/223
    See application file for complete search history.

(56) References Cited

U.S. PATENT DOCUMENTS

| | | | | |
|---|---|---|---|---|
| 5,226,120 A | * | 7/1993 | Brown | H04L 41/12 709/224 |
| 6,473,762 B1 | * | 10/2002 | Knoblock | G06F 17/5004 |
| 6,480,889 B1 | * | 11/2002 | Saito | H04L 29/12113 709/220 |

(Continued)

OTHER PUBLICATIONS

Non-Final Office Action for U.S. Appl. No. 14/319,903 dated Dec. 17, 2015, 19 pages.

*Primary Examiner* — Thomas J Dailey
*Assistant Examiner* — Lam H Duong
(74) *Attorney, Agent, or Firm* — Amin, Turocy & Watson, LLP

(57) ABSTRACT

A device topology definition system works in conjunction with a location indicia detector, such as a topology key or detector, to simplify entry of device location information in a device monitoring system. To mitigate the tedium of entering location information for each device being monitored, the topology key or detector can be inserted into a data port or aperture of a device, or otherwise detect location indicia located on or proximate to a device, and a topology definition system of the device monitoring application will read topology information from the key or detector and logically associate the topology information with the device's identifier. This association is recorded as part of a global topology data set for the monitored devices maintained by the device monitoring application. In the case of a topology key, the topology information stored on the key can be modified prior to inserting the key into another device, allowing device location information to be quickly entered into the device monitoring application without requiring a user to enter the location information manually at the monitoring application's user interface.

20 Claims, 15 Drawing Sheets

(56) References Cited

U.S. PATENT DOCUMENTS

| | | | |
|---|---|---|---|
| 2002/0113706 A1* | 8/2002 | Prado | G06K 17/00 340/571 |
| 2003/0046339 A1* | 3/2003 | Ip | H04L 41/12 709/203 |
| 2005/0246436 A1* | 11/2005 | Day | H04L 29/06 709/223 |
| 2006/0047800 A1* | 3/2006 | Caveney | H04L 41/00 709/223 |
| 2006/0148279 A1 | 7/2006 | German et al. | |
| 2006/0282529 A1* | 12/2006 | Nordin | H04L 41/12 709/224 |
| 2007/0117444 A1 | 5/2007 | Caveney et al. | |
| 2007/0238343 A1 | 10/2007 | Velleca et al. | |
| 2008/0080415 A1* | 4/2008 | Stephenson | H04W 24/02 370/328 |
| 2009/0265318 A1* | 10/2009 | Vermeulen | H04L 41/00 |
| 2009/0282140 A1* | 11/2009 | White | H04L 67/12 709/223 |
| 2010/0091790 A1* | 4/2010 | Wasielewski, Jr. | H04L 12/2869 370/463 |
| 2010/0267274 A1 | 10/2010 | McNally et al. | |
| 2011/0007662 A1* | 1/2011 | Zisapel | H04L 41/12 370/254 |
| 2011/0043371 A1 | 2/2011 | German et al. | |
| 2011/0141943 A1 | 6/2011 | Shifris et al. | |
| 2011/0218730 A1* | 9/2011 | Rider | G01C 21/00 701/533 |
| 2013/0064249 A1 | 3/2013 | Shar et al. | |
| 2015/0039788 A1 | 2/2015 | Dearing et al. | |
| 2015/0236873 A1 | 8/2015 | Austermann, III et al. | |

* cited by examiner

TOPOLOGY DATA — 602

| DEVICE | LOCATION |
|---|---|
| DEVICE 1 | USA/WASHINGTON/SEATTLE/BOTHELL/WAREHOUSE L |
| DEVICE 2 | USA/NEW YORK/LONG ISLAND/123 SMITH RD/202 |
| DEVICE 3 | USA/NEVADA/GROOM LAKE/BUILDING A/ROOM 51 |
| DEVICE 4 | USA/NEVADA/GROOM LAKE/BUILDING A/ROOM 51 |
| ... | ... |
| DEVICE 36 | USA/NEW YORK/LONG ISLAND/123 SMITH RD/202/ROW 3/RU 3 |
| DEVICE 37 | USA/NEVADA/GROOM LAKE/BUILDING A/ROOM 48/ROW 6/RU2 |

DEVICE TOPOLOGY DEFINITION SYSTEM

CROSS-REFERENCE TO RELATED APPLICATIONS

This application claims priority to U.S. Provisional Patent Application Ser. No. 62/146,686, filed on Apr. 13, 2015, and entitled "DEVICE TOPOLOGY DEFINITION SYSTEM," the entirety of which is incorporated by reference.

TECHNICAL FIELD

The disclosed subject matter relates generally to device monitoring systems and, for example, to techniques for setting hierarchical location information for one or more monitored networked devices in a device monitoring application without, or with minimal, entry of data manually at the device monitoring application's user interface.

BACKGROUND

A number of device monitoring applications and systems are available for organizing, viewing, and monitoring devices distributed across one or more networks. Such applications monitor status and operational data for the devices and display this device information on specialized user interfaces in one or more suitable formats.

In addition to identity and status information, some device monitoring applications also maintain topological information identifying each device's location within a hierarchical location topology. This topological information allows the device monitoring application to organize the device data on the interface displays based on the respective locations of the devices. Conventionally, some or all of this location information has been entered manually for each device via the application's user interface. Since the user interface for the device monitoring system may not be located near the devices for which the topology information is being entered, collection and entry of this information can be a tedious and time-consuming process.

The above-described deficiencies of conventional patch panel systems are merely intended to provide an overview of some of the problems of current technology, and are not intended to be exhaustive. Other problems with the state of the art may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein relate to the use of a location indicia device (e.g. key; mobile device) having or detecting indicia of location (e.g. Bar Code, QR Code, optical transmitter such as InfraRed (IR), Radio Frequency Identifier (RFID) tag, wireless transmitter) to assist in collection and entry of device topology information into a device monitoring system. In one or more embodiments, a location indicia device can contain or detect some or all of the topology or location information that is to be associated with one or more devices deployed on a network. When the location indicia device communicates location indicia (via insertion of a key and/or transmission of location indicia) about a monitored hardware device, the device monitoring application executing at another location reads the indicia of location information from the location indicia device and associates such location information with the monitored device. The device monitoring application then updates its record of the larger device topology to reflect the monitored device's location based on the topological indicia received about the monitored device.

This system can allow the user to quickly and easily set the topological or location information for each hardware device of a network. To do so the user moves between the devices to be monitored and, using the location indicia device, detects location indicia for each monitored device by, for instance, insertion of a key and/or transmission of location indicia by a mobile device. The device monitoring application, upon receipt of the location indicia updates the topology information for each device within the networked hierarchy without requiring the user to be physically present at the monitoring system's user interface.

In some embodiments, the topology or location information stored on a topology key, or otherwise detectable from the monitored device, can be modified using a mobile device that communicatively connects to the key and/or detects location indicia on, at or proximate to, the monitored device. For example, the mobile device can execute an application that allows the user to manually update the key's topology information prior to inserting the key into the next device. In some embodiments, the mobile device can also be configured to gather some or all of the topology information by scanning optical machine-readable codes (e.g., barcodes, quick response codes, etc.) affixed to certain structures within the device's environment, where the codes identify the locations of those structures within the location hierarchy. The mobile device can translate the scanned codes to determine the portion of the location hierarchy represented by the code (e.g., a building, a room, a floor, a rack, etc.) and update the topology key's topological data to reflect the scanned location. The key can then be inserted in the devices associated with the location identified by the scanned code to facilitate entry of the devices' locations into the device monitoring system.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

FIG. 6 illustrates an example, non-limiting format for topology data stored in association with a device monitoring application.

DETAILED DESCRIPTION

Figure 1:
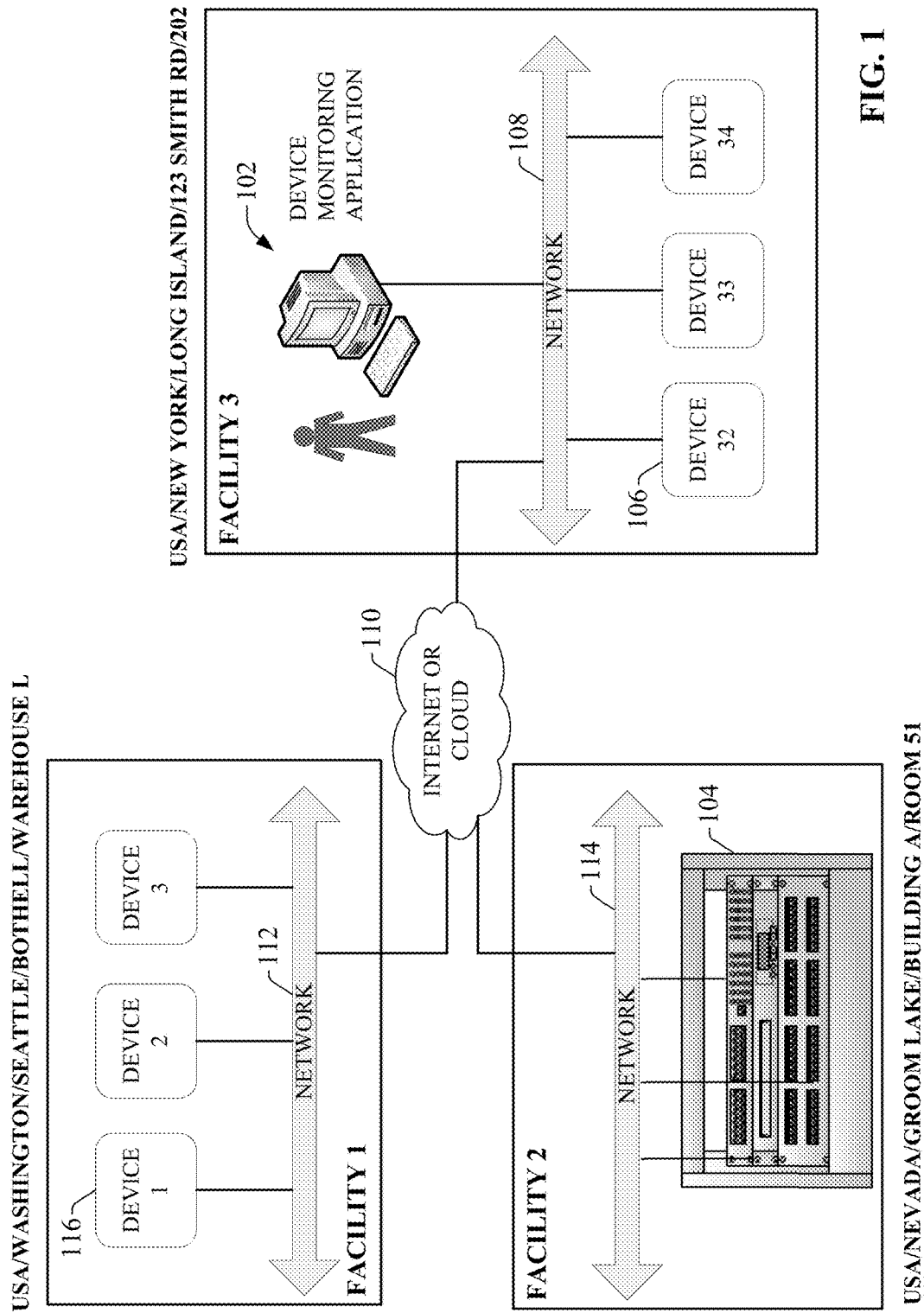
FIG. 1 is a diagram illustrating an example, non-limiting distribution of hardware devices being monitored by a device monitoring application.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in the subject specification and drawings, the terms "object," "module," "interface," "component," "system," "platform," "engine," "selector," "manager," "unit," "store," "network," "generator" and the like are intended to refer to a computer-related entity or an entity related to, or that is part of, an operational machine or apparatus with a specific functionality; such entities can be either hardware, a combination of hardware and firmware, firmware, a combination of hardware and software, software, or software in execution. In addition, entities identified through the foregoing terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts, the electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

FIG. 1 is a diagram illustrating an example, non-limiting distribution of hardware devices being monitored by a device monitoring application 102. In this example, device monitoring application 102 monitors networked devices at three different geographically diverse facilities. Device monitoring application 102 executes on a computing device located at Facility 3 in New York. A set of devices 106 also reside at Facility 3 and share a common network 108 with the device monitoring application 102. Devices 106 may comprise, for example, networked computing devices (e.g., desktop computers, workstations, etc.), network infrastructure devices (e.g., routers, switches, hubs, etc.), patch panel sensor bars, networked meters, or other such devices. Two other remote facilities—Facility 1 in Washington and Facility 2 in Nevada—are also being monitored by device monitoring application 102. The networks at the respective facilities are linked over the Internet or a cloud platform (which may include appropriate firewall devices at each facility, which are omitted from FIG. 1 for clarity). In addition to monitoring the devices 106 on its local network, device monitoring application 102 also monitors a set of devices 116 at Facility 1 and a set of sensor bars mounted on respective rack units of a patch panel 104 at Facility 2 and connected to network 114.

Device monitoring application 102 comprises any type of application that can document, organize, display, and/or monitor the devices distributed across Facilities 1-3. For example, device monitoring application 102 may allow a user to invoke different graphical views of the monitored devices that present information about each device's identity, type, location, operating status, operational statistics, or other such information. In order to generate organized presentations of the monitored devices that assist the user in locating or identifying the respective devices, device monitoring application 102 maintains topology information for each device describing the device's location within a defined location hierarchy. In the example depicted in FIG. 1, the topological hierarchy describes the locations of the devices within a hierarchy having the following format:

<Country>/<State>/<City>/<Building>/<Room> where each element of the data string represents a hierarchical level of the location topology. In accordance with this topology format, the devices residing in Facility 1 are associated with the following location topology:

USA/Washington/Seattle/Bothell/Warehouse L

Similarly, the devices and sensor bars in Facilities 2 and 3 are associated with different topological descriptors reflecting their respective locations within the organizational hierarchy. It is to be appreciated that the techniques described in this disclosure are not limited to the topology formats depicted in FIG. 1, and that different sets of hierarchical levels can be used to describe a device's location. Moreover, the topologies may include additional levels below the <Room> level to identify the device's location with a greater degree of granularity. For example, the locations of the sensor bars on patch panel 104 may be described using additional levels below the <Room> level for <Row> (identifying the row of patch panels containing the patch panel on which the sensor bar is mounted), <Panel> (identifying the patch panel on which the sensor bar is mounted), and <Rack Unit> (identifying the rack unit within the panel on which the sensor bar is mounted).

Conventionally, the topology information for each device has been entered manually via the user interface of the device monitoring application 102, which stores the entered location information in association with the respective devices. The device monitoring application 102 can display organized views of the devices using this stored hierarchical location information. For example, some device monitoring applications may present a navigable tree view of the devices, where different levels of the tree view correspond to the hierarchical levels of the location topology. If the device monitoring application supports alarming or event reporting, the topological information for each device can also be used to identify the location of an alarm or event generated by one of the monitored devices. Other location-specific data presentations are also possible.

Manual entry of the topological location information for each device can be a laborious and time-consuming process. Since the topology information for each device is conventionally entered manually at the monitoring application's user interface, a user usually determines the locations of all the devices being monitored—which may involve traveling to the devices to confirm their locations—and return to the device monitoring application to enter the collected location information locally at the device monitoring application.

To address these and other issues, one or more embodiments described herein provide a device topology definition system that can automate some portions of the device location collection process. The topology definition system can be an integrated component of a device monitoring application used to facilitate setting the location information for devices being monitored by the application. The topology definition system is configured to recognize location-specific indicia including, but not limited to, a hardware key or readable indicia of location such as Bar Codes, QR Codes, optical transmitters such as IR, RFID tags, wireless transmitters—referred to herein variously as a topology key or location indicia—that has been inserted into, or is otherwise communicatively connected to or associated with, a device being monitored by the device monitoring application. The topology key or location indicia device may include a data storage element containing topology information describing at least a portion of a location topology. When a topology key is inserted into a data port of a monitored hardware device, the device topology definition system running on the device monitoring application recognizes the topology key and identifies the hardware device into which the topology key was inserted. When a mobile device detects location indicia on or proximate the monitored hardware device, it may be transmitted to, and recognized by, the device topology definition system running on the device monitoring application. In either case, the system then reads such topology information and associates the obtained topology information with a logical device identifier of the device. This association between the device identifier and the location represented by the topology information is stored in memory associated with the device monitoring application. Using this system, a user can quickly associate location information with a set of devices by moving to each device and inserting a key containing the location information, or otherwise detecting the location indicia at or around the monitored device, to be associated with the device.

In various embodiments, the topology data contained on the key, can be modified using a portable device, either by manually entering some or all of the new topology data via a mobile device and/or by optically scanning new location indicia located on or around (e.g. barcodes, quick response (QR) codes and the like) affixed near the devices. If a set of devices are to be associated with the same location information (e.g., a set of devices residing in the same room), the user can move between the devices and insert the key into, or otherwise detect location indicia at or around, the respective devices without changing the information stored on the key or other detection means. The topology definition system will recognize when the key has been inserted into the respective devices, or detect location indicia by other means, and create the logical associations between the devices and the location information in the device monitoring application. In the case of a topology key, when the user moves to a device in another location, the user can modify the relevant portion of the topology data stored on the key before inserting the key into the next device.

Figure 2:
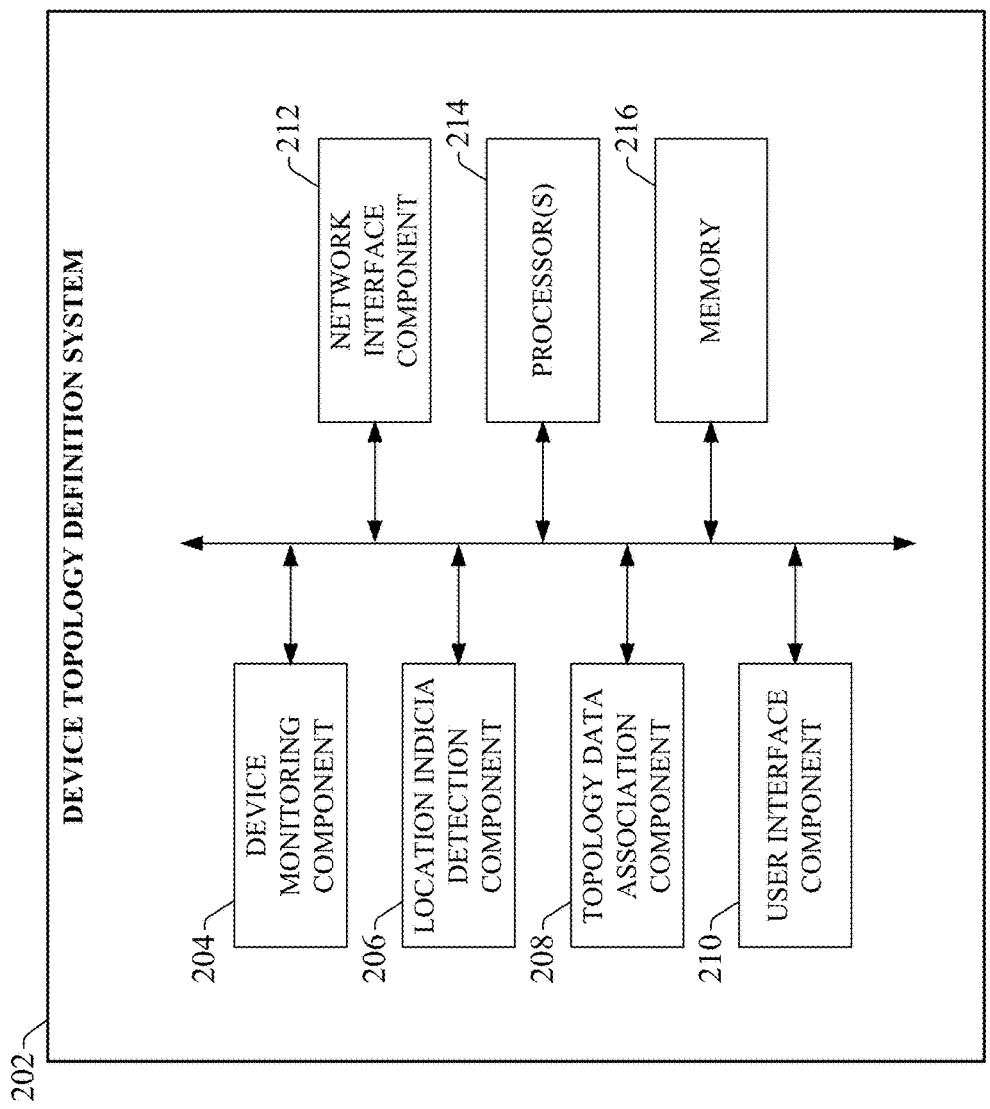
FIG. 2 is a block diagram of an example device topology definition system.

FIG. 2 is a block diagram of an example device topology definition system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Device topology definition system 202 may include a device monitoring component 204, a location indicia detection component 206, a topology data association component 208, a user interface component 210, a network interface component 212, one or more processors 214, and memory 216. In various embodiments, one or more of the device monitoring component 204, location indicia detection component 206, topology data association component 208, user interface component 210, network interface component 212, the one or more processors 214, and memory 216 may be electrically and/or communicatively coupled to one another to perform one or more of the functions of the device topology definition system 202. In some embodiments, components 204, 206, 208, 210, 212, and 214 may comprise software instructions stored on memory 216 and executed by processor(s) 214. Device topology definition system 202 may also interact with other hardware and/or software components not depicted in FIG. 2. For example, processor(s) 214 may interact with one or more external user interface devices, such as a keyboard, a mouse, a display monitor, a touchscreen, or other such interface devices.

Device monitoring component 204 may be configured to monitor one or more hardware devices via one or more local or remote networks. Location indicia detection component 206 may be configured to detect and recognize various forms of location indicia (e.g. Bar Code, QR Code, optical transmitter such as IR, RFID tag, wireless transmitter) on, at or proximate the monitored device which can be read to create a logical association between the topology data and the monitored device.

In the case of a location indicia detection component 206 configured to detect a topology key that has been communicatively connected to a device being monitored by the device monitoring component 204, the location indicia detection component 206 may be configured to detect that the topology key has been physically inserted into a data port of a device being monitored, or that the key has been communicatively connected to the device over a wireless connection (e.g., a near field connection or other type of wireless connection). In one or more embodiments, the topology key can store a recognizable key signature or other type of key identification data that can be recognized by the location indicia detection component 206 when the key is inserted into the device.

The topology data association component 208 may be configured to, in response to detection of the topology key—or other location indicia as in the case of a mobile device detector—by the location indicia detection component 206, read the topology data stored on the topology key or detected by other means. The topology data association component then creates a logical association between the topology data and a device identifier of the device into which the topology key was inserted, or from which other location indicia was otherwise detected. User interface component 210 may be configured to render output data generated by the topology definition system 202 and to receive input data from a user. For example, the user interface component 210 may generate user interface displays that present output data visually and/or audibly, and that are configured to receive user input via interaction with the displays. Network interface component 212 may be configured to communicatively interface the device topology definition system 202 to a public or private network (e.g., an Ethernet network, a public network such as the Internet, a cloud platform, etc.). The one or more processors 214 may perform one or more of the functions described herein with reference to the systems and/or methods disclosed. Memory 216 may be a computer-readable storage medium storing computer-executable instructions and/or information for performing the functions described herein with reference to the systems and/or methods disclosed.

Figure 3B:
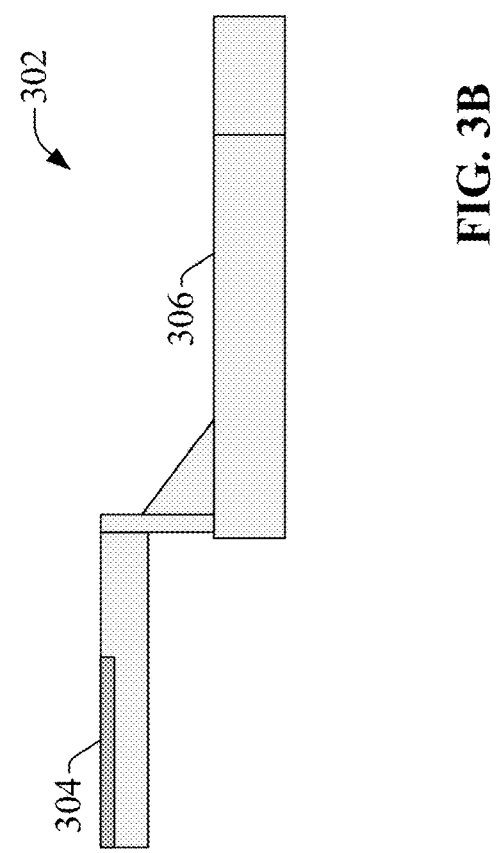
FIG. 3B is a side view of an example topology key that can be used in conjunction with a device topology definition system.
Figure 3A:
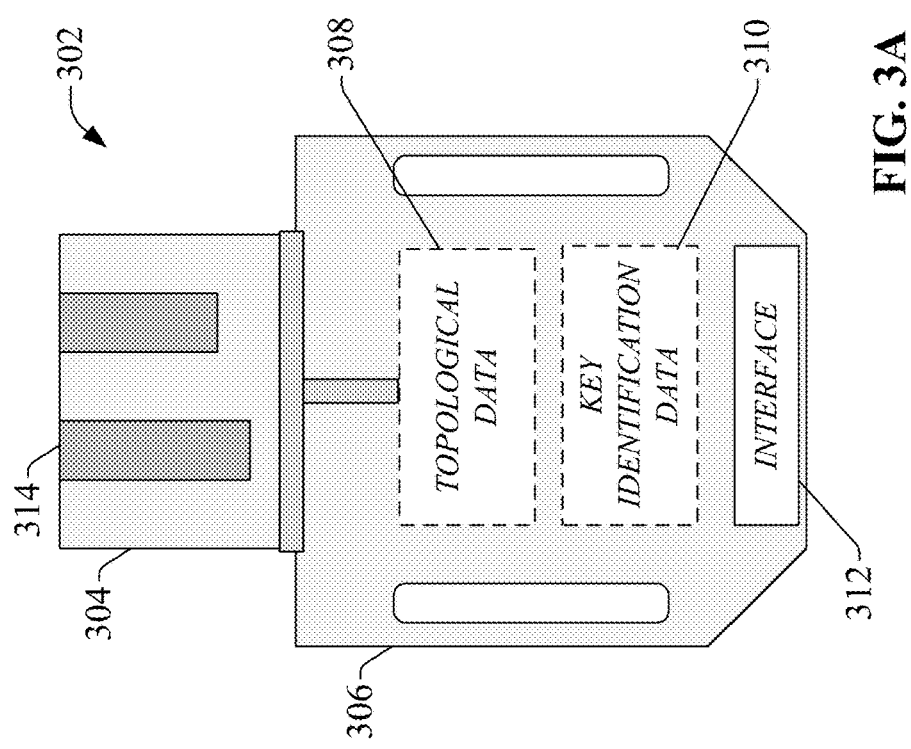
FIG. 3A is a top view of an example topology key that can be used in conjunction with a device topology definition system.

FIGS. 3A and 3B are top and side views, respectively, of an example when the location indicia device is comprised at least in part of topology key 302 that can be used in conjunction with the device topology definition system 202. It is to be appreciated that the form factor illustrated in FIGS. 3A and 3B is only intended to be exemplary, and that the topology key can conform to any suitable form factor without departing from the scope of one or more embodiments described herein. For example, FIGS. 3A and 3B depict an example topology key 302 configured to be physically inserted into a data port of a device being monitored by a device monitoring application. However, in some embodiments the topology key may comprise a small wireless mobile device configured to interface with the monitored device over a wireless connection when it is brought within a detection range of the monitored device.

Topology key 302 may comprise a main body 306 that houses a memory or data storage area, and a plug 304 configured to be inserted into a port or aperture of a hardware device. Topology key 302 may also be configured to be affixed to the surface of, or be otherwise disposed in association with, a hardware device. The data storage area of the main body 306 is configured to store topological data 308 identifying a location to be associated with a hardware device being monitored by a device monitoring application. The topological data 308 can comprise a single location identifier (e.g., a rack unit of a rack, a building, a room, etc.) or can comprise a string of multiple hierarchical location identifiers (e.g., <Country>/<State>/<City>/<Building>/<Floor>/<Room>/<Row>/<Rack>). The topology key 302 is configured to allow the topological data 308 to be modified as desired. For example, the topology key 302 may be interfaced to a mobile device (e.g., a mobile phone or other personal device) executing a specialized application that guides the user through the process of setting or modifying the topological data 308. To facilitate modifying the topological data 308, the mobile device can interface with the topology key 302 via an interface port 312, or via the contacts 314 of plug 304.

The data storage area of the main body 306 is also configured to store key identification data 310 that identifies the key to the device topology definition system 202 when the key is inserted into a hardware device being monitored by the device monitoring component 204. The key identification data 310 may comprise any suitable identifier that allows the key to be uniquely identified as a topology key 302 by the device topology definition system 202; e.g., a unique data string or signature that identifies the key as a topology key 302 containing topology data to be associated with a monitored device.

Plug 304 can be designed to mate with any suitable type of device data port including, but not limited to, universal serial bus (USB), 1-wire, registered jack, or other types of data ports, or aperture. Regardless of the plug's type, the plug 304 may include one or more contacts 314 that may allow data (e.g., the topological data 308 and key identification data 310) to be read from and/or written to the topology key for key 302 configured to be inserted into a data port or aperture disposed on or around the monitored device. Plug 304 may also be configured as a blocking, non-conductive plug that is insertable into an aperture or port disposed on or around the monitored device.

Figure 4:
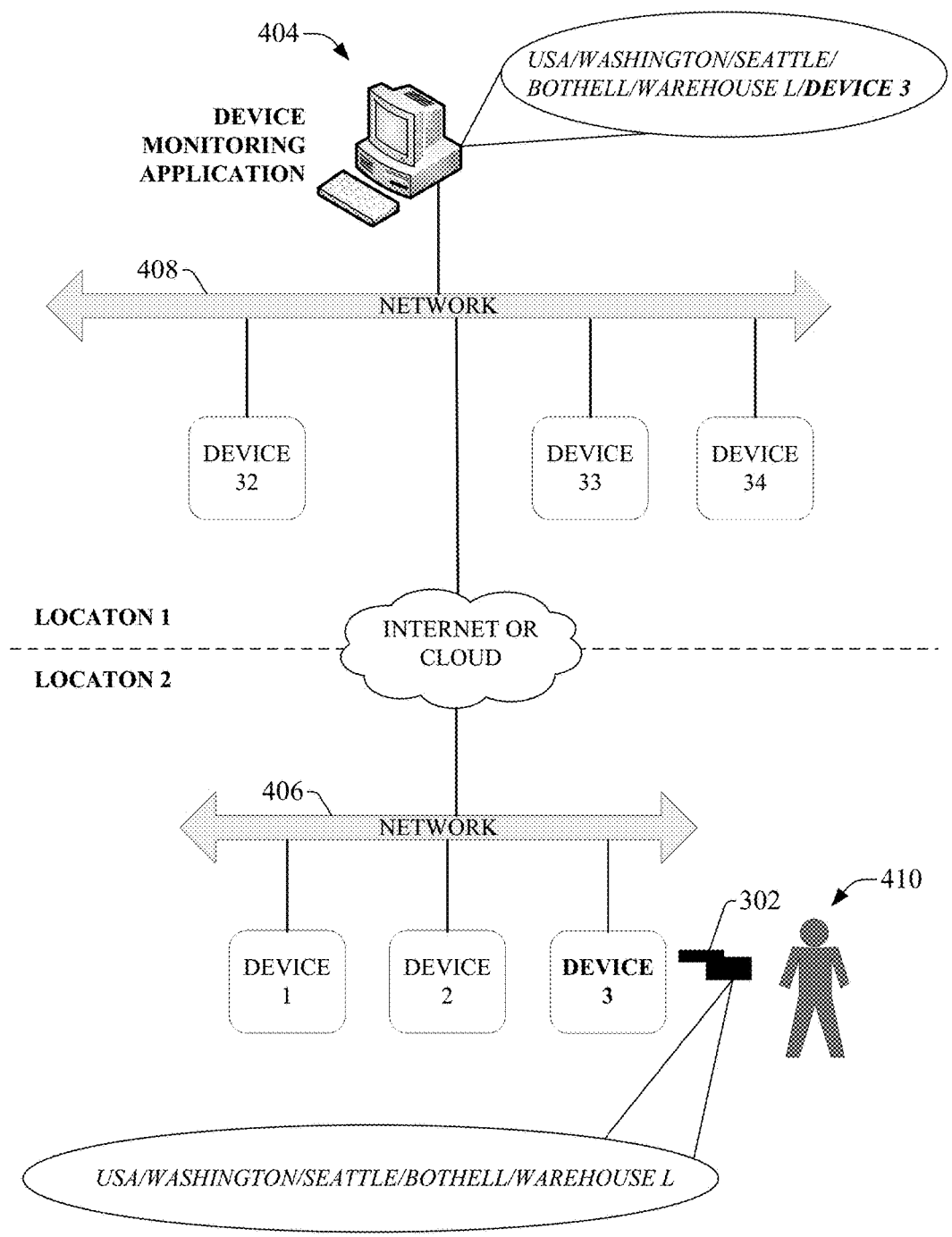
FIG. 4 is a diagram illustrating remote configuration of a device's location using a topology key.

FIG. 4 is a diagram illustrating remote configuration of a device's location using location indicia such as topology key 302. Similar to the scenario illustrated in FIG. 1, device monitoring application 404 resides at a first location (Location 1) and monitors a number of networked devices, including local devices (Devices 32, 33, and 34) residing on the same network 408 as the device monitoring application 404 and remote devices (Devices 1, 2, and 3) residing on a remote network 406 at another location (Location 2), which may be a separate building relative to Location 1. Device monitoring application 404 accesses information on Devices 1, 2, and 3 via an intermediate external network, such as the Internet or a cloud platform.

In this example, device topology definition system 202 is an integrated component of device monitoring application 404. Initially, device monitoring application 404 has no location or topology information for Device 3 located at Location 2. A user 410 at Location 2 possesses a topology key 302 containing the topology information, or key 302 or other mobile device capable of detecting such topological information, corresponding to the room—Warehouse L—in which Device 3 is located. The topology information is stored on the topology key 302 or other detection means, formatted as a hierarchical location string, where the levels of the hierarchy correspond to the Country (USA), State (Washington), City (Seattle), Building (Bothell), and Room (Warehouse L).

Rather than entirely manually entering the topology information into the user interface of the device monitoring application 404 at Location 1, the user at Location 2 may insert topology key 302 into a data port or aperture on Device 3, or use some other type of detector to detect or read location indicia on or around the monitored device. Such location indicia may be detected in whole by the device monitoring application 404 using topology key 302 or other location indicia detector. Alternatively, some portion of the location indicia may be detectable by the device monitoring application 404 while another portion is manually input by user 410.

Alternatively, if the topology key 302 is a wireless key, the user 410 can establish a communication link between the topology key and the monitored device via a wireless connection (e.g., a near field connection) by bringing the topology key within a detection range of the device. In response to insertion of the key (or establishment of the wireless connection between the key and the device), the device topology definition system 202 running on the device monitoring application 404 recognizes the topology key 302, reads the topology information stored on the key, and creates a logical association in the device monitoring application 404 between Device 3 and the location indicated by the topology information.

Thus, the device topology for the set of monitored devices is automatically updated, eliminating or minimizing the need for manual entry, to add the topology information for Device 3 (USA/Washington/Seattle/Bothell/Warehouse L/Device 3) directly into the user interface of the device monitoring application 404. Using this technique, user 410 can update the location information for all devices at Location 2 by moving to each device and inserting topology key 302 into each device, or otherwise detecting location indicia on or around each device, updating such topology information stored on the topology key 302, or otherwise detected, as desired if a device is to be associated with a different location (e.g., if the device resides in a different room).

Figure 5:
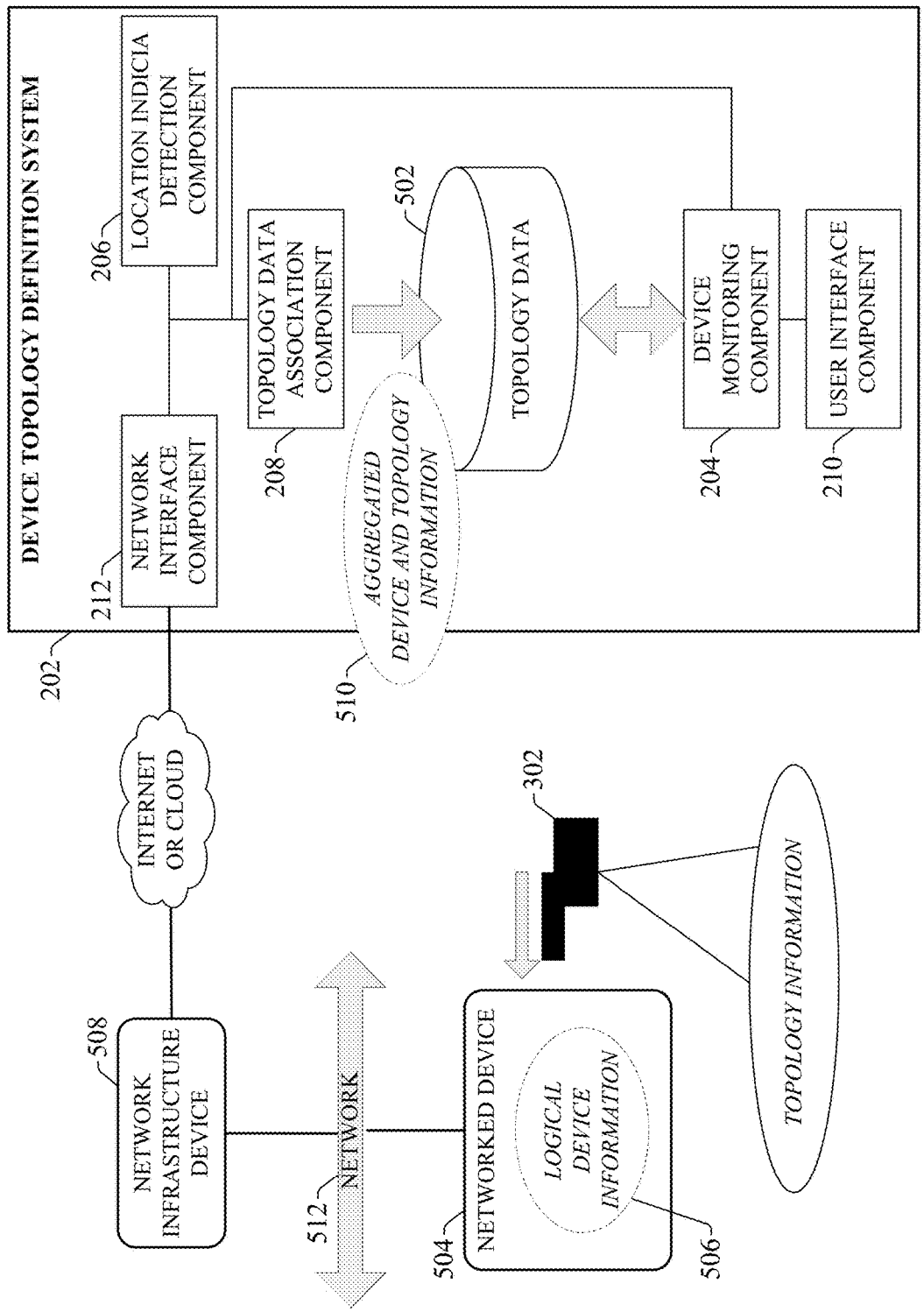
FIG. 5 is a diagram illustrating collection of topology information by a device topology definition system.

FIG. 5 is a diagram illustrating collection of topology information by the device topology definition system in more detail. In this example, networked device 504 resides on network 512, which may be a local or remote network relative to device topology definition system 202 (network 512 is depicted as a remote network in FIG. 5). Networked device 504 may comprise, for example, a networked computing device such as a workstation or other such device, a network infrastructure device such as a hub or router, a meter or other type of telemetry device, a sensor bar mounted on a rack unit of a patch panel, or other such device. The device 504 contains logical device information 506 on local memory that uniquely identifies the device (e.g., a machine access control (MAC) address or other device identifier).

A device monitoring application including the device topology definition system 202 is configured to monitor a collection of distributed devices—including device 504—and report status and/or configuration information for the devices (e.g., operational statuses and statistics, alarm information, etc.). To this end, network interface component 212 communicatively connects the device topology definition system 202 to a network (e.g., an Ethernet network or other type of local area network). Device monitoring component 204 is provided with the network addresses and/or device identifiers of the devices to be monitored, which may reside on the same local area network as the device monitoring application or a remote network (e.g., network 512) accessible to the network interface component 212 via an intermediate public or private network (e.g., the Internet or a cloud platform). Device monitoring component 204 can then read status and/or operational data from the devices via the network interface component 212 and render the device data on one or more user interface displays generated by the user interface component 210.

Although the user interface component 210 renders the device data in association with the device identifiers for the respective devices from which the data was received, the device identifiers alone typically do not convey the locations of their associated devices within the organizational topology. With knowledge of the locations of the respective devices, the user interface component 210 can generate more informative views of the device data; e.g., views that organize the device information according to their locations within the organizational topology. Accordingly, the device topology definition system 202 maintains in local storage topology data 502 defining the locations of the respective monitored devices. As noted above, topology data 502 can define, for each device, a single location identifier (e.g., a building, a room, a rack unit of a patch panel rack, etc.) or a hierarchical location string describing the device's location in terms multiple hierarchical location identifiers. FIG. 6 illustrates an example, non-limiting format for topology data 502. As shown in this figure, for each device identifier 602, topology data defines a location 604 in terms of a hierarchical location topology.

Returning now to FIG. 5, device monitoring component 204 and user interface component 210 can combine the monitored device status and/or operational data with the topology data 502 in order to present organized views of the devices and their associated status information. For example, by leveraging the topology data 502, user interface component 210 can present a browsable tree view of the devices that allows the user to navigate through the hierarchical device levels in order to locate a device of interest. In another example, the user interface component 210 can present the location information as metadata that can be invoked when the user selects a given device. In yet another example presentation, the user interface component 210 can generate a list view of the monitored devices, where the listed devices are organized or segregated according to their locations. The user interface component 210 may also use the topology data 502 to identify the location of an alarm or an event associated with one of the monitored devices. For example, if a sensor bar of a patch panel is being monitored, an insertion or removal of a patch cable detected by the sensor bar can cause the user interface component 210 to generate a notification of the insertion or removal, together with location information identifying the location of the sensor bar at which the insertion or removal was detected, where the location is determined based on the stored topology information for the sensor bar.

Figure 7:
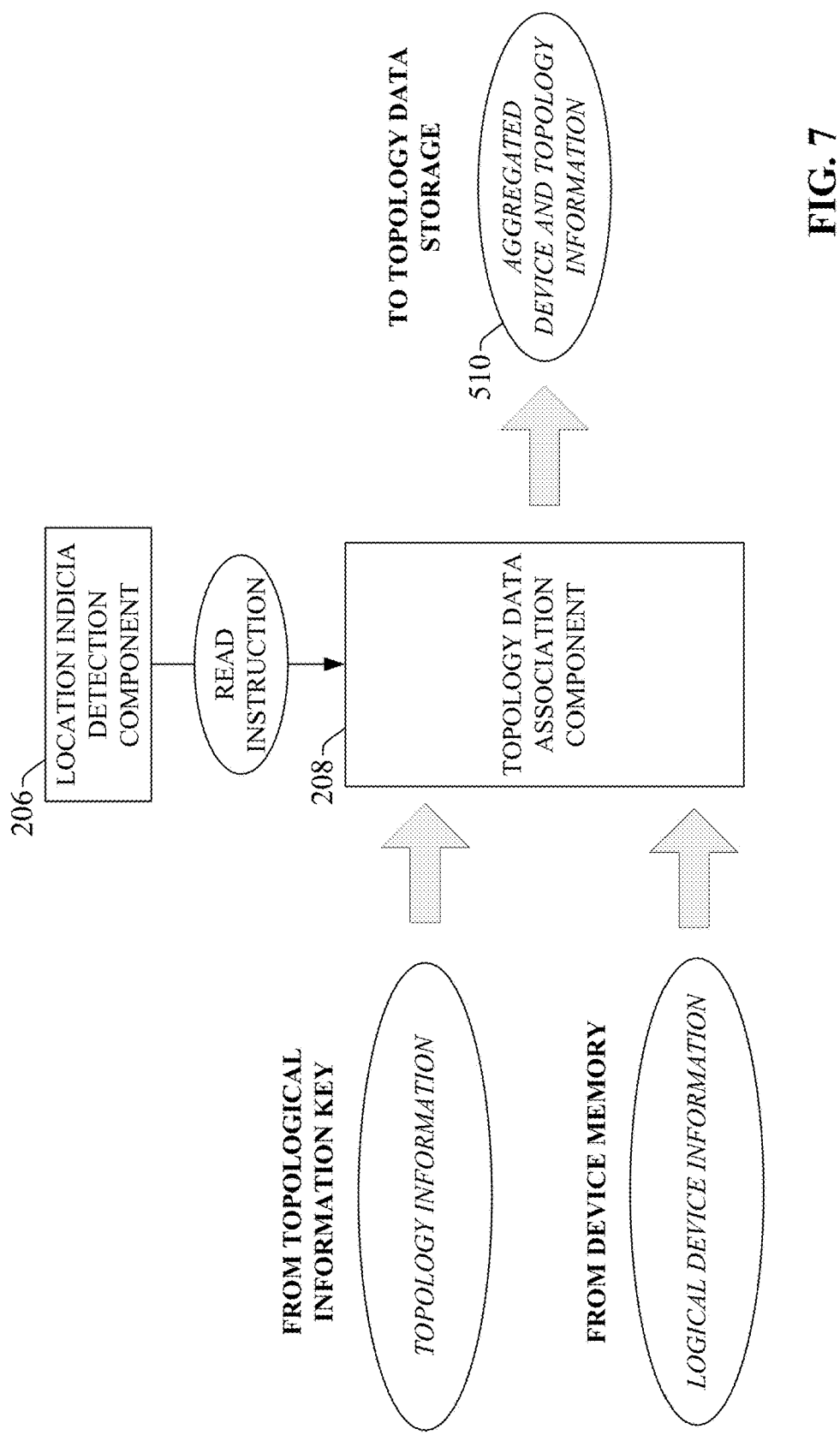
FIG. 7 is a diagram illustrating association of topology information read from a topology key with logical device information read from a device's memory.

To mitigate the tedium of entry of the entirety of topology data 502 manually, topology key 302, or other means of capture of location indicia, may be used as described above in connection with FIG. 4 to populate the topology database with location information for a given device without requiring a user to be present at the device monitoring application. In the example illustrated in FIG. 5, topology key 302 stores the topology information to be associated with networked device 504. When, for instance, topology key 302 is inserted into a data port of device 504 (or wirelessly connected to device 504), location indicia detection component 206 detects insertion of the key and recognizes the key as a topology key based on the key identification data 310 stored on the key's memory. In response to verifying insertion of the topology key into the device, location indicia detection component 206 instructs topology data association component 208 to associate the topology information stored on the key with the device 504 into which the key was inserted. In response to this instruction, topology data association component 208 reads both the topology information from the key (via the local network and any intermediate networks between the device topology definition system 202 and the device 504) and the logical device information 506 stored on the device 504. The logical device information 506 comprises a device identifier (e.g., a MAC address, a user-configured device name, etc.) that can be used by the system to uniquely identify the device 504. As illustrated in FIG. 7, the topology data association component 208 then logically associates the logical device information 506 and topology information to yield aggregated device and topology information 510, and updates the global set of topology data 502 to reflect the aggregated information. For example, if the device monitoring component 204 was already configured to monitor device 504 but the device was missing a location definition, the topology data association component 208 will locate a device definition record for the device 504 based on the logical device information 506 and populate the empty location field for the device definition record with the topology information read from the key 302.

In some embodiments, the key 302 can be inserted into a new device that has not yet been defined in the device monitoring application to facilitate both adding the device to the application's monitoring list and defining the location of the device within the organizational topology. In such embodiments, when the key 302 is inserted into (or some other form of location indicia is detected for) a device not yet being monitored by the device monitoring application, the key 302 or location indicia detector can cause the device to output an identification signal via its network port that allows the location indicia detection component 206 to recognize the presence of the device. The topology data association component 208 can then read the logical device information from the new device as well as the topology information stored on the key or otherwise detected, and create a new device definition record for the device that includes the device identifier and the associated location information for the device.

Figure 8:
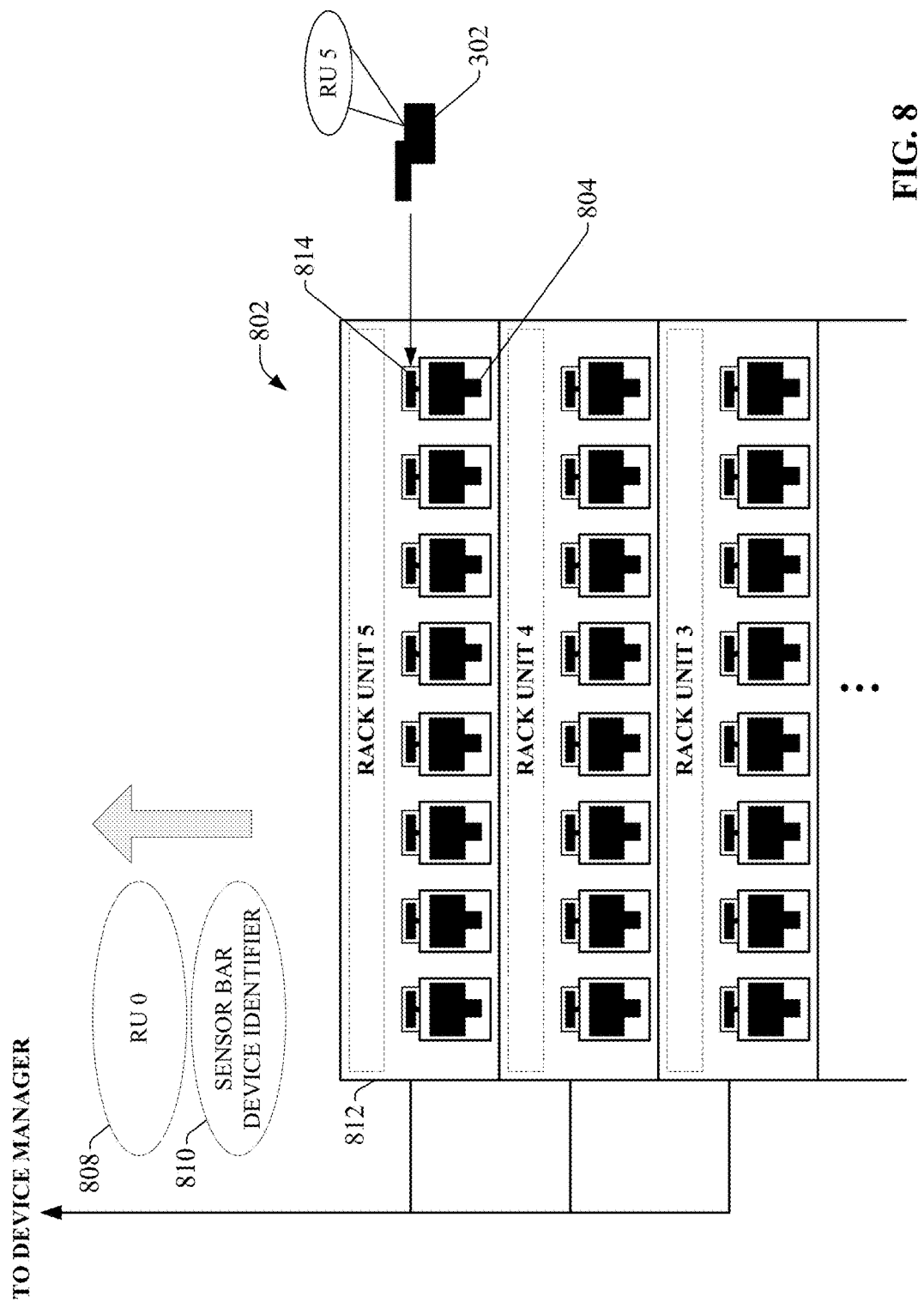
FIG. 8 is a diagram illustrating an example usage of a topology key to configure location information for a set of patch panel sensor bars.

FIG. 8 is a diagram illustrating an example usage of the topology key 302 to configure location information for a set of patch panel sensor bars. Patch panels are commonly used to manage network cable connections between networked devices and/or network infrastructure equipment. Typically, incoming and outgoing network cables (e.g., copper or fiber optic cables) are affixed to the back side of the patch panel, with each cable wired to a respective port 804 located on the front face of the panel 802. Connections between the networked devices can then be managed by connecting selected ports 804 on the front of the patch panel 802 together using patch cables. Patch panels allow a technician to easily reroute, isolate, segment, or reconfigure physical networks from a single location.

Figure 9:
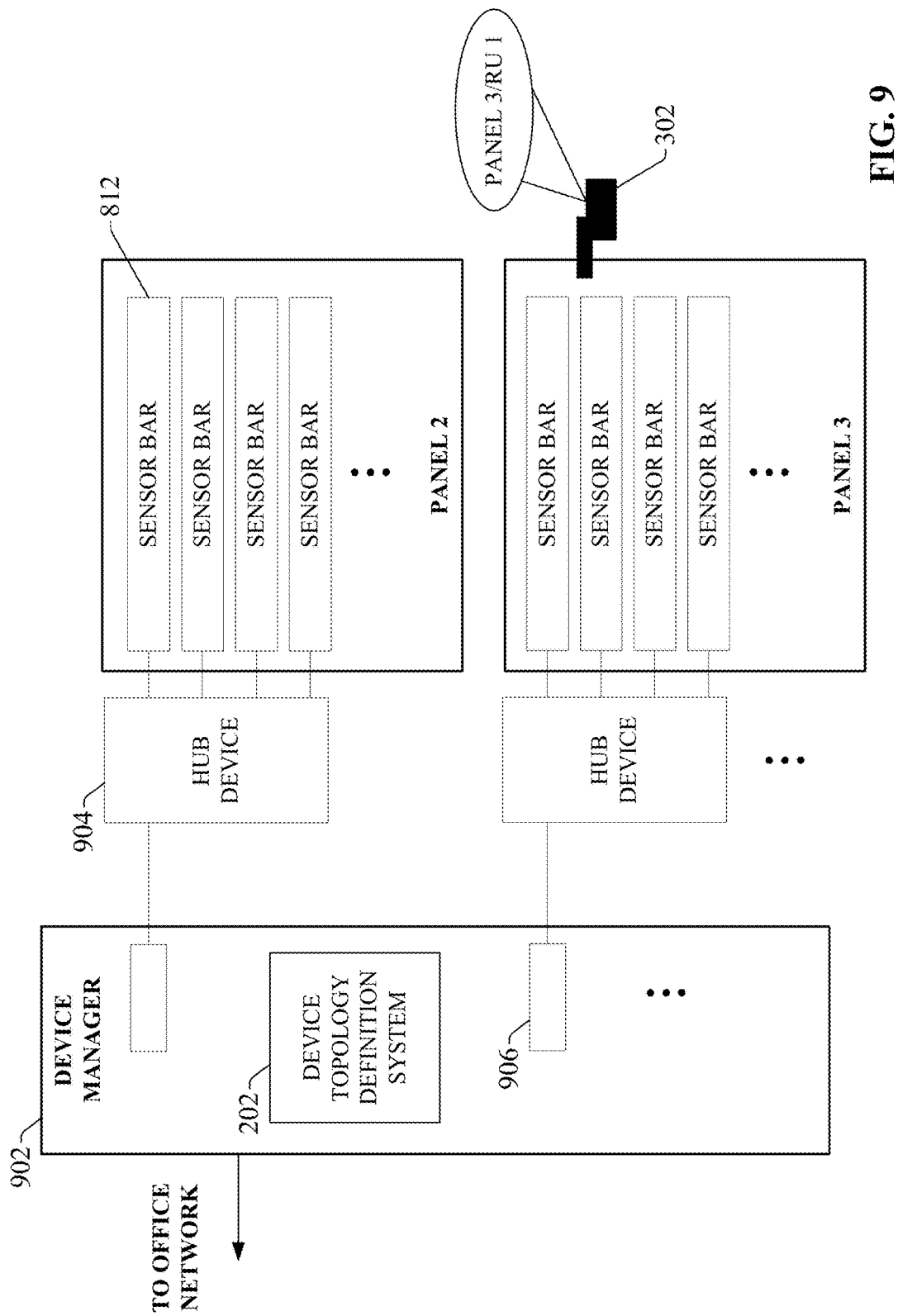
FIG. 9 is a diagram illustrating a patch panel network including a device manager configured to define sensor bar locations based on information read from a topology key.

Each row of ports 804 comprises a rack unit of the patch panel. To facilitate remote monitoring of the patch panel connections, sensor bars 812 can be mounted to the front face of each rack unit, either as integrated components of the patch panel 802 or as modular components that mount as overlays on the front of each rack unit of the patch panel 802. Each sensor bar 812 may comprise a row of sensor ports 814 (e.g., 1-wire ports) oriented above each port 804 for receiving memory chips (e.g., 1-wire chips or other storage media) attached to the plugs of respective patch cords. When a patch cord or port blocker plug outfitted with a memory chip is inserted into a port 804 of one of the patch panel's rack units, a sensing circuit on the sensor bar 812 corresponding to that rack unit reads the identification information from the memory chip on the plug and thus identifies the plug and its location on the panel. As illustrated in FIG. 9, the sensor bars 812 can interface with a device manager 902 over a network connection (e.g., an Ethernet connection, a USB connection, etc.), either directly or via a hub device 904. The device manager 902 receives cable and port identification information from the sensor bars via the network connection for processing. Based on the identification data received from sensor bars 812, device manager 902 generates and stores network documentation information including records of network connections and statuses. Device manager 902 can also present network status information to a user via a graphical user interface; e.g., by sending network status data to a client device. Example client devices can include, but are not limited to, devices running a Web application, a Simple Network Management Protocol (SNMP) application, or a Web Services on Devices (WSD) application.

In order to accurately document the patch panel connections, the device manager 902 has access to location information identifying—for each sensor bar—the particular patch panel and rack unit (RU) of the panel on which the sensor bar is mounted. To simplify entry of this location information, device manager 902 can include a device topology definition system 202, which works in conjunction with the topology key 302 to associate the correct rack unit identifier with each sensor bar. In this patch panel example, the sensor bars are the devices for which location information is to be entered, and the patch panel and RU identifiers represents the location information to be entered for each sensor bar.

Returning to FIG. 8, topology key 302 is configured to store a rack unit identifier (e.g., RU 5). In this example, the plug of topology key 302 has a form factor that compliments the sensor ports 814 of the sensor bars (e.g., a 1-wire plug or other type of connector). Inserting the topology key 302 into any of the sensor ports 814 of one of the sensor bars 812 causes the location indicia detection component (an integrated component of the device manager) to detect insertion of the key and to instruct the topology data association component to read the RU identifier 808 stored on the key as well as the sensor bar device identifier 810 stored on the sensor bar's memory. The topology data association component running on the device manager then logically associates the RU identifier and sensor bar device identifier in the device manager and updates the global set of sensor bar topology data based on the association. Using this technique, a user can quickly associate the correct rack unit identifier with each sensor bar in the panel by modifying the rack unit identifier on the key (e.g., changing RU 5 to RU 4) and inserting the key into a sensor port 814 of the sensor bar corresponding to the new rack unit identifier. Subsequently, when a patch cable is inserted into one of the ports 804 of the sensor bar—causing the cable's memory chip to be inserted into the corresponding sensor port 814—the device manager will know which rack unit (e.g., RU 5) the cable has been plugged into based on the previously established association between the sensor bar's device identifier and the location information read from the key.

If an organization uses only a single patch panel, the rack unit identifier (e.g., RU 1, RU 2, etc.) can be stored on the topology key 302, since the patch panel will be known and is already distinguished from other patch panels. Nonetheless, if a distinction is to be made between multiple patch panels (as shown in the example depicted in FIG. 9), the topology key 302 can be configured to store both a panel identifier and a rack unit identifier (e.g., Panel 3/RU 1). Similarly, if an organization has multiple patch panels in multiple different rooms, a room identifier can also be added to the topology information stored on the key 302. In general, the granularity of the topology information stored on the topology key 302 can be set as desired in order to uniquely identify the location of a given device within a particular organization's location hierarchy.

Figure 10:
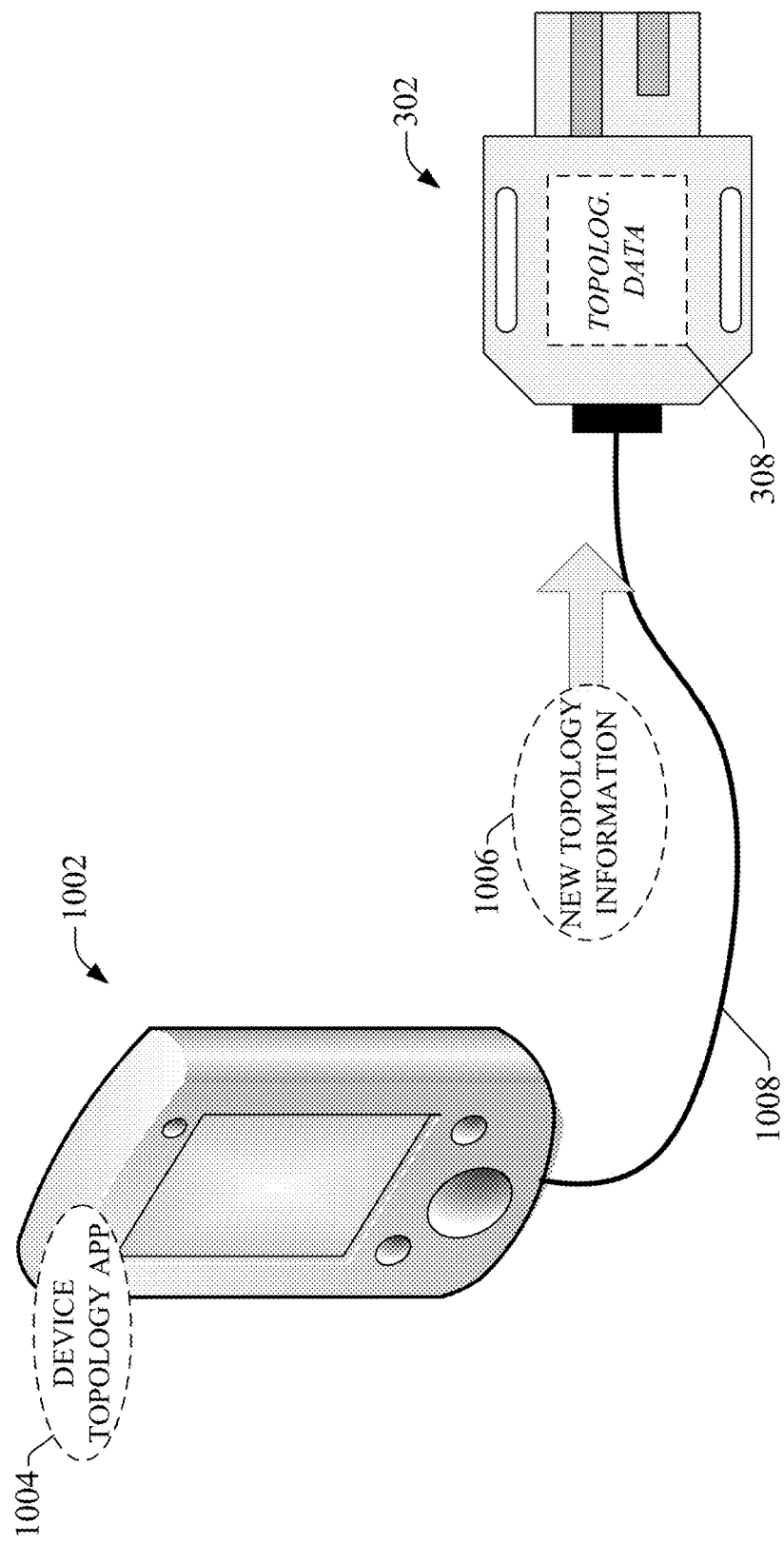
FIG. 10 is a diagram illustrating the use of a mobile device to modify topology data on a topology key.

As noted above, the topological data 308 stored on the topology key 302 can be modified using a mobile device in one or more embodiments. FIG. 10 is a diagram illustrating the use of a mobile device 1002 to modify the topological data 308. In an example implementation, mobile device 1002 can comprise a customized device configured to interface with the key 302 over a data cable 1008 for the purpose of setting or modifying topological data 308. In another example, mobile device 1002 can comprise a personal mobile device (e.g., a mobile phone, a tablet computer, or other personal device) on which a device topology application 1004 has been installed. The device topology application 1004 can generate interface displays that guide the user through the process of setting the topological data 308, and can further instruct the mobile device 1002 how to communicate with topology key 302 in order to write the user-provide topological information 1006 to the appropriate memory location on the key 302. Interface screens generated by device topology application 1004 can include, for example, screens that allow the user to define the hierarchical categories that will make up the topology (e.g., Country, State, Building, Room, etc.) and screens that prompt the user to enter location-specific values for each of the defined categories. The mobile device 1002 can then write the competed hierarchy to the topology key 302 over data cable 1008 in response to user selection of a "write" control. Using mobile device 1002, the user can make any changes to the topological data 308 on key 302 as the user moves between devices configuring the location information. If the user is configuring location information for multiple devices, the user can modify the portion of the topological data that changes between devices rather than re-entering the entire topology string. For example, after inserting the key into a first device to set the location for that device to be USA/Washington/Seattle/Bothell/Room 206, the user may move to another device located in the same building but a different room. Accordingly, the user can modify the <Room> portion of the topology string stored on the key prior to inserting the key into the next device.

Figure 11:
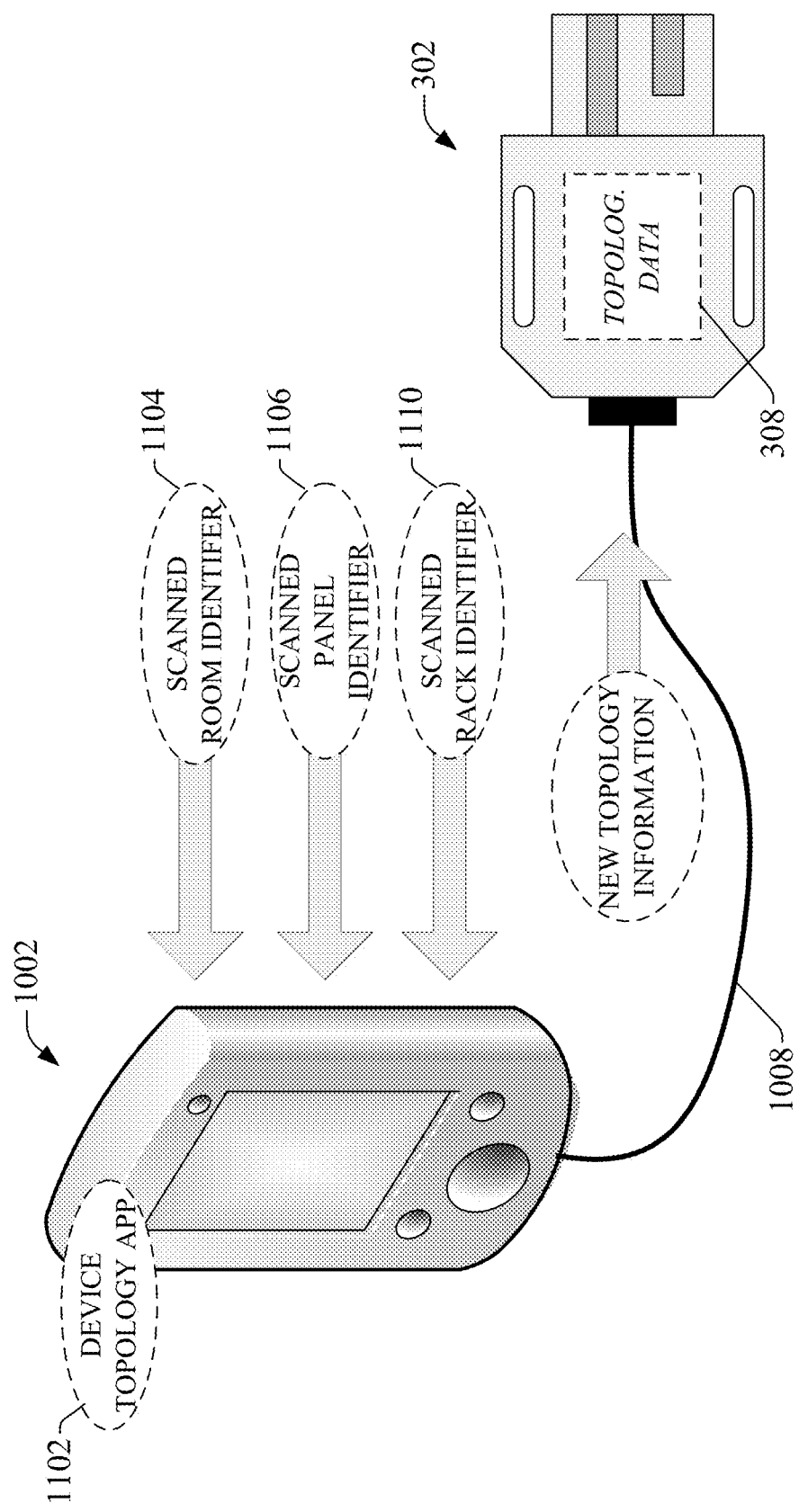
FIG. 11 is a diagram illustrating the use of scanned codes to update topological data on a topology key.

In another example technique for setting the key's (or other location indicia detector's) topological data, the device topology application may be configured to translate scanned optical codes (e.g., Quick Response (QR) codes, barcodes, etc.) representing all or portions of a location topology and to write these scanned values to the key 302 or other location indicia detector. FIG. 11 is a diagram illustrating the use of scanned codes to update the topological data 308. In this example, QR codes or other types of optical codes may be fixed to structures on or near the device, where each QR code represents a location. For example, a room within a building may have a QR code mounted near the door of the room that encodes the location topology for the room (e.g., USA/Washington/Seattle/Bothell/IT Room). The room may house multiple patch panels with respective sets of sensor bars that are each associated with a location within the organizational topology. Accordingly, each patch panel may be affixed with a main QR code that encodes a patch panel identifier for the panel, and individual rack QR codes mounted next to each RU of the patch panel.

With these QR codes in place, the user can launch the device topology application 1102 on mobile device 1002 and use the mobile device's native optical reading functions (e.g., the device's camera or other optical reader) to scan the respective codes corresponding to a particular sensor bar. For example, the user can use the mobile device 1002 to first scan the room code, capturing the portion of the location topology comprising the <Country>, <State>, <City>, <Building>, and <Room> levels (room identifier 1104). The user can then locate the patch panel containing the sensor bar to be configured, and scan that patch panel's QR code to capture the panel identifier 1106. Finally, the user can scan the QR code next to the RU containing the sensor bar to capture the rack identifier 1110. As each code is scanned, the device topology application 1102 recognizes the portion of the topology represented by the code and populates the appropriate levels of the topology hierarchy. Once the completed topology hierarchy has been captured, the user can write the new topological information to the key 302, which can then be inserted into a sensing port of the sensor bar to facilitate configuration of the sensor bar's location by the device monitoring application (located elsewhere in the building or at another facility).

Although the examples depicted in FIGS. 10 and 11 depict a topology key being connected to a mobile device using a data cable to facilitate modifying the key's topological data, other embodiments of the topological definition system may forego use of the topology key 302, as noted previously for other location indicia detectors, and instead allow the mobile device itself, for instance, to serve as a "key" for location indicia detection. In such embodiments, the topological information entered or scanned into the device topology application is stored locally on the mobile device in association with the application. Instead of writing the topology information to a key that is then inserted into the device, a data cable can be used to connect the mobile device to the data port of the device for which the location data is to be set. The location indicia detection component 206 of the device topology definition system 202 can detect that a mobile device running the device topology application has been inserted into the device. In this regard, the device topology application itself serves a similar function to the key identification data 310 used to identify the topology key 302 to the location indicia detection component. The device topology application 1102 can then pass the entered or scanned topology information to the device topology definition system (via the data cable, the networked device, and any intervening networks), and the topology data association component can set the device's location as described in previous examples.

Figure 12:
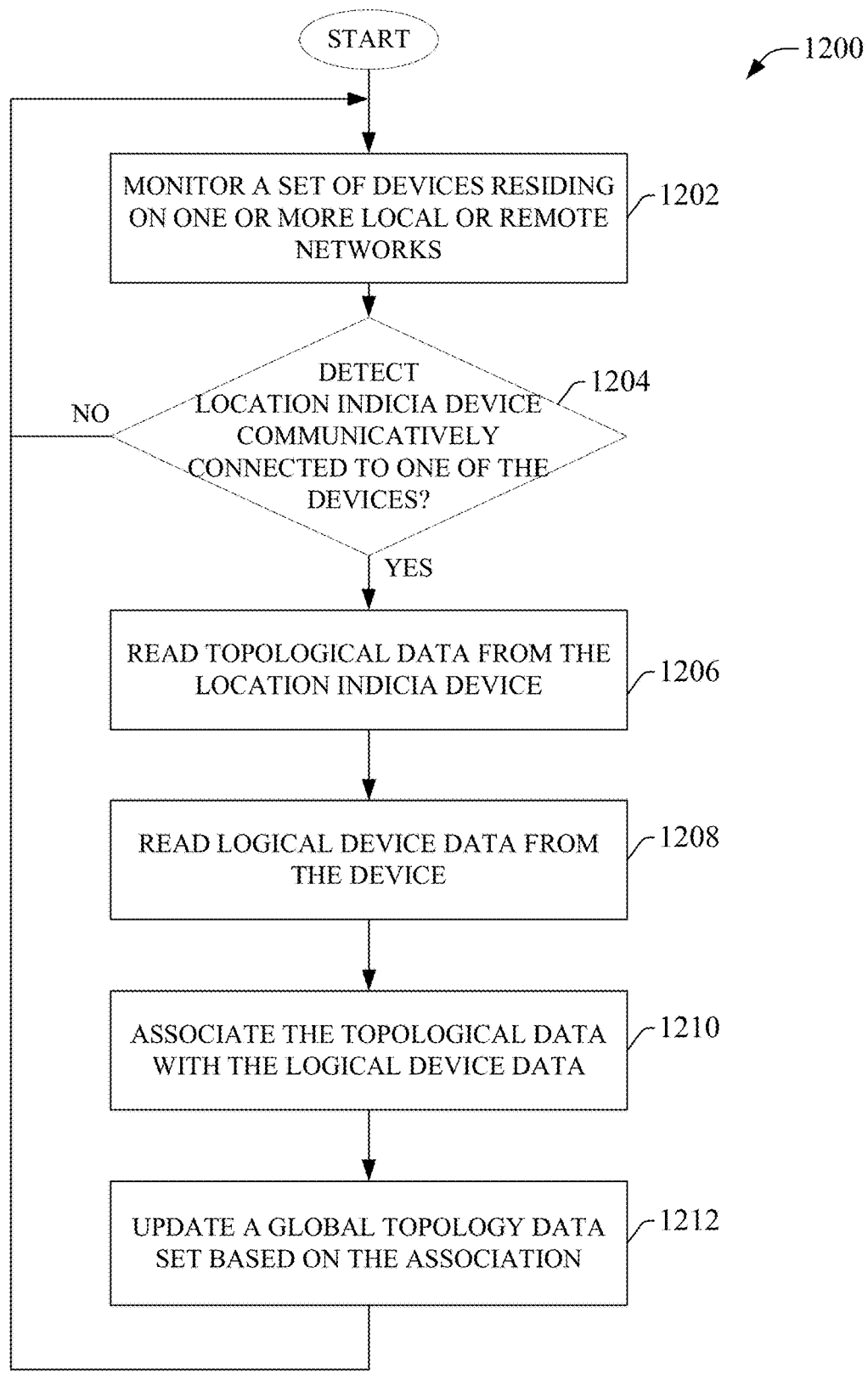
FIG. 12 is a flowchart of an example methodology for configuring location information for a monitored device in a device monitoring application.
Figure 13:
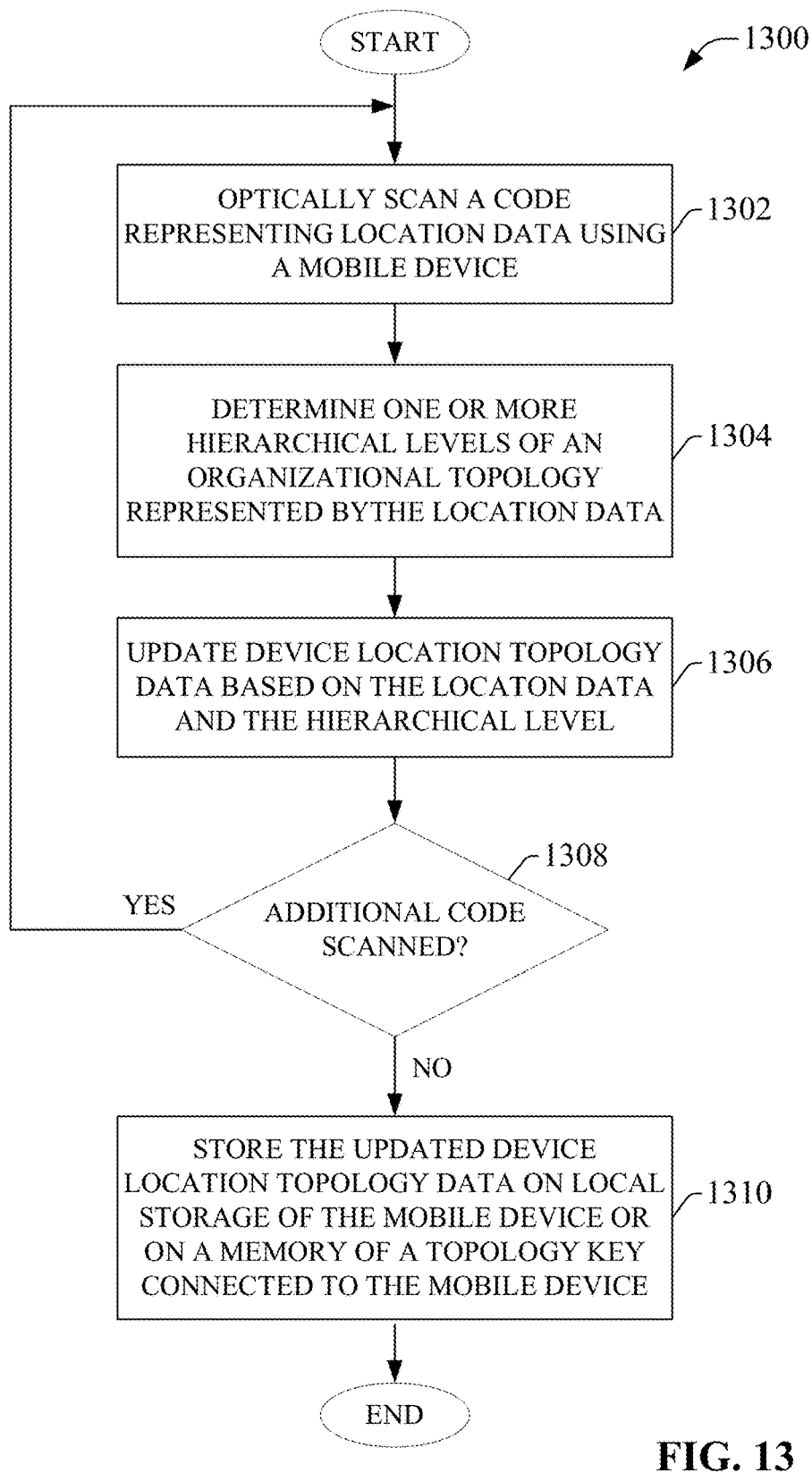
FIG. 13 is a flowchart of an example methodology for updating topological data on a topology key used to set location information for networked monitored devices.

FIGS. 12-13 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 12 illustrates an example methodology 1200 for configuring location information for a monitored device in a device monitoring application. Initially, at 1202, a set of devices residing on one or more local or remote networks is monitored. The devices can be monitored by a device monitoring application configured to monitor and display identification, status, and operational information for the set of devices. The device can comprise, for example, networked computing devices, network infrastructure devices, patch panel sensor bars, meters, or other networked devices.

At 1204, a determination is made regarding whether a location indicia device has been communicatively connected to one of the devices. In one or more embodiments, the location indicia device can comprise a topology key that has been inserted into a data port of the device (e.g., a 1-wire port, a USB port, an Ethernet port, etc.). The topology key can be recognized based on key identification data stored in memory on the key, which can be detected and read by the device monitoring application via the one or more local or remote networks. The key can be inserted into a data port of the device. In one or more other embodiments, the location indicia device can comprise a wireless device that interfaces wirelessly with the device when the wireless device is brought within a detection range of the device (e.g., using near field communication, RFID communication, etc.) If the location indicia device is not detected (NO at 1204), the methodology returns to step 1202 and continues monitoring the devices. If the location indicia device is detected (YES at step 1204), the methodology proceeds to step 1206, where topological data is read from the location indicia device. The topological data represents a location within an organization at which a monitored device is located, and may comprise a single location identifier (e.g., a room, a rack unit, a building, etc.) or a hierarchical location identifier describing the location in terms of increasingly granular hierarchical levels.

At 1208, logical device data is read from the device with which the location indicia device is communicating (e.g., the device into which the location indicia device was inserted or to which the location indicia device has been wirelessly connected). The logical device data can comprise a unique device identifier (e.g. a MAC address, a customized device name, etc.) stored in memory on the device. At 1210, the topological data read at step 1206 is associated with the logical device data read at step 1208. At 1212, a global topology data set for the monitored devices is updated based on the association established at step 1210. The global topology data set can be used by the device monitoring application to render organized, location-specific presentations of the monitored devices via a user interface.

FIG. 13 illustrates an example methodology 1300 for updating topological data on a topology key used to set location information for networked monitored devices. Initially, at 1302, a code representing location data is optically scanned using a mobile device. The code can comprise, for example, a QR code, a barcode, or other type of code that can be optically scanned and decoded to obtain the location data. The code may be affixed to a structure whose location the code describes (e.g., a wall of a room identified by the location data, a patch panel identified by the location data, etc.). The mobile device can comprise a mobile phone, a customized mobile device designed to update topological information on a topology key, or another type of portable device. At 1304, one or more hierarchical levels of an organizational topology represented by the location data is determined. For example, if the code scanned at step 1302 represents a room number, the hierarchical level can be determined to be <Room>. Similarly, if the code represents a rack unit of a patch panel, the hierarchical level can be determined to be <RU>. In some scenarios, the code may contain multiple hierarchical levels of the topology in order to accurately describe the location. For example, a Room code may contain not only the room number, but also several higher topological levels above the <Room> level (e.g., Country/State/Building/Room).

At step 1306, device location topology data is updated based on the location data scanned at step 1302 and the hierarchical level determined at step 1304. For example, if the location data is determined to correspond to a <Room> level, a <Room> field of the device location topology data is populated with the location data (e.g., the room number) that was scanned and decoded at step 1302. The device location topology data can be maintained on the mobile device that performed the optical scan of the code at step 1302, and can be appropriately updated each time new location data is scanned and decoded.

At step 1308, a determination is made regarding whether an additional code has been scanned. If no additional code has been scanned (NO at step 1308), the updated device location topology data is stored on local storage of the mobile device or on a memory of a topology key connected to the mobile device. Either the mobile device or the topology key can then be used to set location information for a monitored networked device by inserting either the topology key or a data cable connected to the mobile device into a data port of the monitored device, as described in previous examples.

If it is determined at step 1308 that an additional code has been scanned (YES at step 1308), the methodology returns to step 1302, and steps 1302-1306 are repeated to update the device location topology data based on the newly scanned location data. The newly scanned location data may correspond to a different hierarchical level than the previous scan. Accordingly, the newly scanned location data may be used to update a different portion of the device location topology data relative to the previous scan. Multiple codes corresponding to different hierarchical levels can be scanned sequentially until a complete location topology for a device is constructed, which can then be used to update a record of the device's location in a device monitoring application, as described in previous examples.

Figure 14:
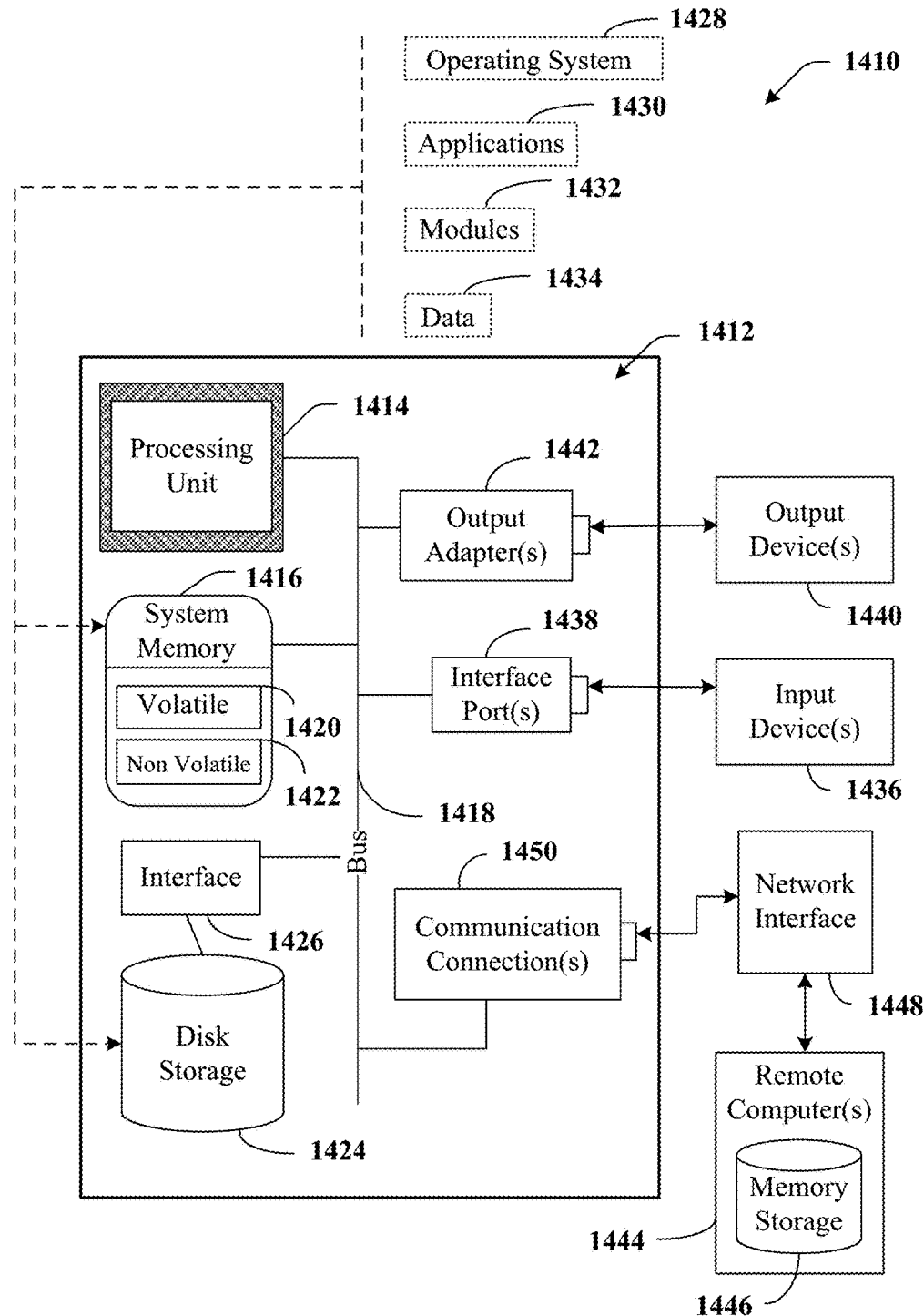
FIG. 14 is an example computing environment.
Figure 15:
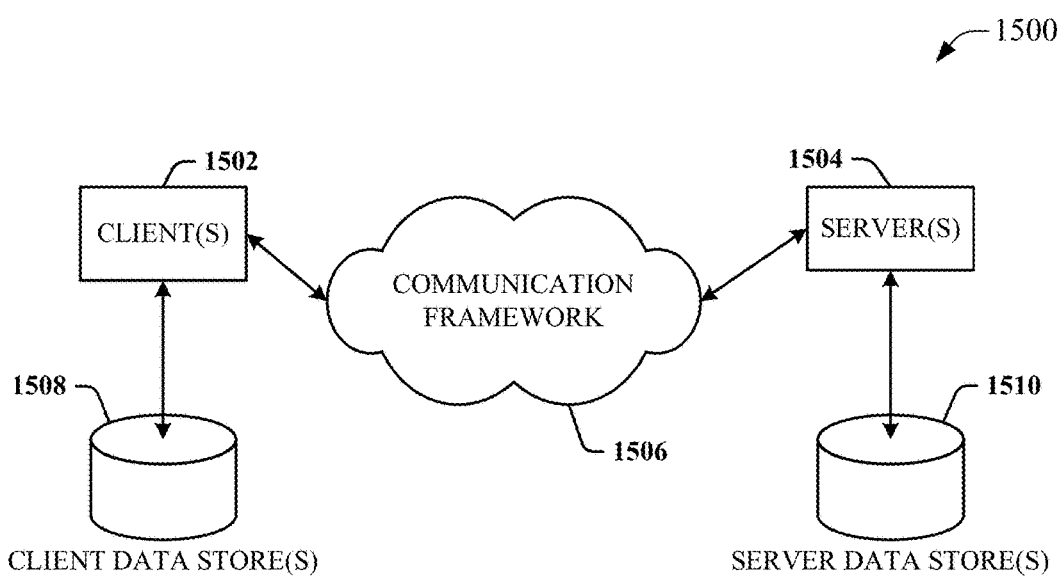
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented.

With reference to FIG. 14, an example environment 1410 for implementing various aspects of the aforementioned subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Multi-core microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable PROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer 1412. System applications 1430 take advantage of the management of resources by operating system 1428 through program modules 1432 and program data 1434 stored either in system memory 1416 or on disk storage 1424. It is to be appreciated that one or more embodiments of the subject disclosure can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapters 1442 are provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the system bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample computing environment 1500 with which the disclosed subject matter can interact. The sample computing environment 3800 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a first memory that stores executable components; and
    a processor, operatively coupled to the first memory, that executes the executable components, the executable components comprising:
        a device monitoring component configured to remotely monitor, via one or more networks, status information for one or more networked devices, the one or more networked devices comprising at least one patch panel sensor bar;
        a location indicia detection component configured to remotely detect, via the one or more networks, that a location indicia device containing topological data has been inserted into a sensor port of a patch panel sensor bar of the at least one patch panel sensor bar; and
        a topology data association component configured to, in response to detection by the location indicia detection component that the location indicia device has been inserted into the sensor port;
            read, via the one or more networks, topological data from a second memory of the location indicia device,
            read, via the one or more networks, a device identifier of the patch panel sensor bar from a third memory of the patch panel sensor bar, and
            create an association between the topological data and the device identifier of the patch panel sensor bar,
        wherein the topological data identifies a location within an organizational topology and comprises at least a rack unit identifier.

2. The system of claim 1, wherein the topology data association component is further configured to update a global topology data set for the one or more networked devices based on the association.

3. The system of claim 1, wherein the topological data defines the location as one or more hierarchical location identifiers including the rack unit identifier.

4. The system of claim 3, wherein the one or more hierarchical location identifiers further comprise at least one of a country identifier, a state identifier, a city identifier, a street identifier, a building identifier, a floor identifier, a room identifier, a row identifier, or a panel identifier.

5. The system of claim 1, wherein the one or more networks comprise at least one of a local area network to which the system is connected, a network that is remote relative to the system, a public network, or a cloud platform.

6. The system of claim 1, wherein
    the location indicia detection component is further configured to detect, via the one or more networks, that the location indicia device has been communicatively connected to another networked device of the one or more networked devices,
    the topology data association component is further configured to, in response to detection by the location indicia detection component that the location indicia device has been communicatively connected to the other networked device;
        read, via the one or more networks, the topological data from the location indicia device,
        read, via the one or more networks, another device identifier of the other networked device from a fourth memory of the other networked device, and
        create another association between the topological data and the other device identifier of the other networked device, and
    the other networked device comprises at least one of a computing device, a network infrastructure device, or a telemetry device.

7. The system of claim 2, wherein the executable components further comprise a user interface component configured to generate a user interface display that renders a view of the one or more networked devices based on the global topology data set.

8. A method, comprising:
    remotely monitoring, via one or more networks by a system comprising at least one processor, networked devices comprising at least one patch panel sensor bar;

remotely detecting, by the system via the one or more networks, that a location indicia device containing topological data has been inserted into a sensor port of a patch panel sensor bar of the at least one patch panel sensor bar; and in response to the detecting:
reading, by the system via the one or more networks, topological data from the location indicia device, wherein the topological data defines a location within an organizational hierarchy and a rack unit identifier,
reading, by the system via the one or more networks, a device identifier of the patch panel sensor bar from the patch panel sensor bar, and
defining, by the system, an association between the topological data and the device identifier read from the patch panel sensor bar.

9. The method of claim 8, further comprising updating, by the system, a global topology data set based on the association, wherein the global topology data set defines respective locations for the networked devices.

10. The method of claim 8, wherein the reading the topological data comprises reading hierarchical location identifiers comprising at least one of a country identifier, a state identifier, a city identifier, a street identifier, a building identifier, a floor identifier, a room identifier, a row identifier, or a panel identifier.

11. The method of claim 8, further comprising,
in response to remotely detecting, by the system via the one or more networks, that the location indicia device has been inserted into a data port of another device of the networked devices:
reading, by the system via the one or more networks, the topological data from the location indicia device,
reading, by the system via the one or more networks, another device identifier from the other device, wherein the other device is at least one of a computing device, a network infrastructure device, or a telemetry device, and
defining, by the system, another association between the topological data and the other device identifier read from the other device.

12. The method of claim 8, wherein the reading comprises reading, as at least a portion of the topological data, location information that has been scanned by the location indicia device from an optical code.

13. The method of claim 9, further comprising generating, by the system, a graphical view that presents an organization of the networked devices based on the global topology data set.

14. A non-transitory computer-readable medium having stored thereon instructions that, in response to execution, cause a system comprising a processor to perform operations, the operations comprising:
remotely monitoring, via one or more networks, operational data generated by at least one networked device, the at least one networked device comprising at least one patch panel sensor bar;
detecting, via the one or more networks, that a location indicia device has been inserted into a sensor port of a patch panel sensor bar of the at least one patch panel sensor bar; and in response to the detecting:
reading, via the one or more networks, topological data from a first memory of the location indicia device, wherein the topological data specifies a location within an organizational hierarchy in terms of at least a rack unit identifier,
reading, via the one or more networks, a device identifier of the patch panel from a second memory of the patch panel sensor bar, and
associating the topological data with the device identifier of the patch panel sensor bar.

15. The non-transitory computer-readable medium of claim 14, wherein the reading the topological data comprises reading one or more hierarchical location identifiers comprising the rack unit identifier and at least one of a country identifier, a state identifier, a city identifier, a street identifier, a building identifier, a floor identifier, a room identifier, a row identifier, or a panel identifier.

16. The non-transitory computer-readable medium of claim 14, wherein the operations further comprise updating a global topology data set based on the associating, the global topology data set defining a location of the at least one networked device.

17. The non-transitory computer-readable medium of claim 16, wherein the operations further comprise generating a graphical view that presents an organization of the at least one networked device based on the global topology data set.

18. The non-transitory computer-readable medium of claim 17, wherein the generating comprises generating the graphical view to render at least one of an identity of the at least one networked device, a type of the at least one networked device, a location of the at least one networked device, or an operating status of the at least one networked device.

19. The system of claim 1, wherein the location indicia device comprises
a 1-wire plug configured to be inserted into the sensor port of a patch panel sensor bar,
a main body that houses the second memory, and
an interface port configured to interface with a mobile device,
wherein the location indicia device is configured to modify the topological data in accordance with updated topological data received from the mobile device via the interface port.

20. The system of claim 19, wherein location indicia detection component is configured to remotely detect that the location indicia device has been inserted into the sensor port based on detection of key identification data stored on the second memory.

* * * * *